C. T. ALLCUTT.
ELECTRICAL MEASURING INSTRUMENT.
APPLICATION FILED MAR. 2, 1917.
1,385,979.
Patented Aug. 2, 1921.
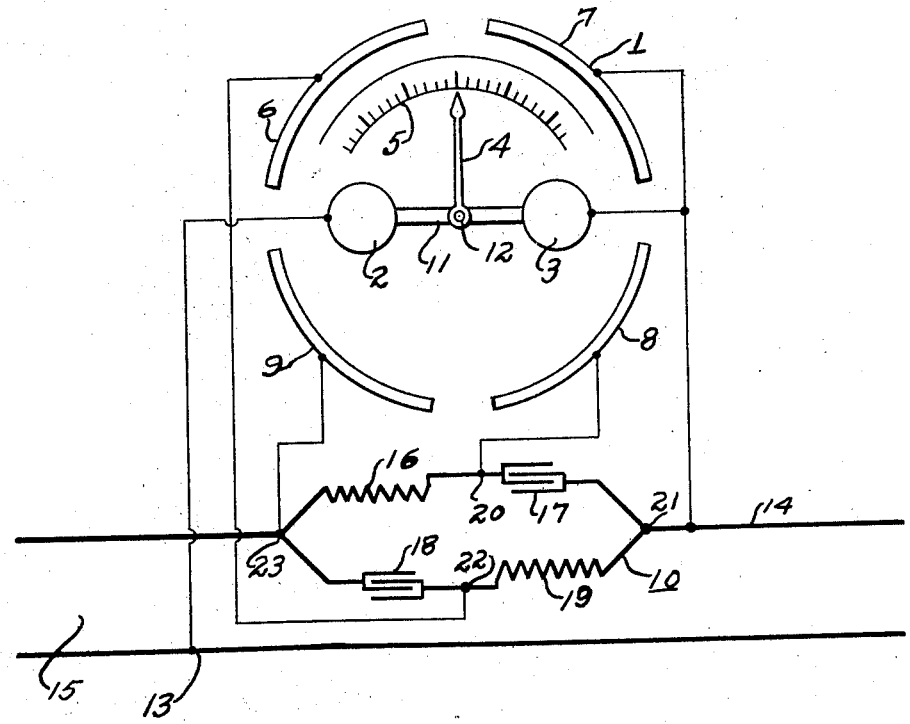
WITNESSES:
William Siler
JHProcter
INVENTOR
Chester T. Allcutt.
BY
Wesley G. Carr
ATTORNEY

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,385,979.                Specification of Letters Patent.       Patented Aug. 2, 1921.

Application filed March 2, 1917. Serial No. 151,989.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to means for, and methods of, so producing symmetrical rotating electrostatic fields that the phase-relations in a single-phase circuit may be readily determined.

One object of my invention is to provide a measuring instrument of the above indicated character that shall accurately indicate the phase-relation or power-factor of a single-phase circuit.

Another object of my invention is to provide means whereby the current traversing a single-phase circuit may be so applied to a plurality of conducting members that a symmetrical rotating electrostatic field may be produced between the conducting members.

In practising my invention, I provide two movable conducting members that are operatively connected to the respective conductors of the circuit the phase-relation of which is to be determined, four stationary conducting members that are arranged around the movable conducting members and a bridge that is connected in series with the circuit and has equal-capacity reactance and resistance arms. The terminals of the bridge are connected to the respective stationary conducting members for the purpose of producing a symmetrical rotating electrostatic field therebetween. A pointer may be attached to the movable conducting members to coöperate with a scale to indicate the power-factor of the circuit. That is, the movable conducting members will turn to predetermined positions in accordance with the phase-angular relation between the current and the voltage of the circuit.

The single figure of the accompanying drawing is a diagrammatic view of an electrostatic power-factor meter embodying my invention.

The electrostatic power-factor meter 1 comprises, in general, two movable conducting members 2 and 3, a pointer 4, a scale 5, four stationary conducting members 6, 7, 8 and 9 and a phase-splitting bridge 10.

The conducting members 2 and 3 are substantially spherical in shape and are mounted on the respective ends of an insulating member 11. The member 11 is mounted on a shaft 12 upon which the pointer 4 is also mounted, and the members 2 and 3 are connected to the respective conductors 13 and 14 of the circuit 15 the power-factor of which is to be determined.

The phase-splitting bridge 10 comprises four arms 16, 17, 18 and 19, the arms 16 and 19 of which have substantially equal resistances of sufficiently large value to obtain a relatively high voltage drop when full-load current traverses the circuit 15. The arms 17 and 18 comprise condensers having capacity reactances substantially equal to the resistances of the arms 16 and 19. By such an arrangement of resistors and condensers, the current traversing the circuit 15 may be so split that four different out-of-phase potentials may be obtained at the respective terminals of the bridge. That is, the conductor 8 is connected to the terminal 20 of the bridge, the conductor 7 is connected to the terminal 21, the conductor 6 is connected to the terminal 22, and the conductor 9 is connected to the terminal 23 of the bridge, to thus cause a symmetrical rotating electrostatic field to be produced between the conductors 6, 7, 8 and 9.

It will be readily understood that the movable members 2 and 3 are responsive to the potential, and that the members 6, 7, 8 and 9 are responsive to the current, of the circuit 15. It will also be understood that the members 6, 7, 8 and 9 may be movable and the members 2 and 3 stationary, if desired, it being merely necessary that there shall be relative movement between the two sets of members.

If the members 2 and 3 are placed at random with respect to the members 6, 7, 8 and 9, a torque will be exerted between the stationary and movable members. However, since the movable members 2 and 3 are free to move without restraint, they will turn under the influence of the torque that is produced until they assume a position where the torque becomes zero. If, under these conditions, the currents of the alternating-current circuit 15 are in phase with the potential of the circuit, this position of the pointer 4 will indicate unity power-factor on the scale 5. If the currents in the circuit 15 shift in phase relatively to the electromotive forces, the rotating electrostatic field between the stationary members 6, 7, 8 and 9 will shift correspondingly in time phase, thereby disturbing the balance of the torque existing between the movable and the stationary conducting members of the instrument to cause the movable members 2 and 3 to assume a new position of equilibrium corresponding to the new value of the power-factor. The varying values of power-factor are thus indicated by the positions assumed by the movable pointer 4 in coöperation with the scale 5.

I do not limit my invention to the particular arrangement of bridge shown nor to the particular structure of the power-factor meter, as many modifications may be made therein without departing from the spirit and scope of the invention as set forth in the appended claims.

I claim as my invention:

1. In a single-phase electric circuit, the combination with four conducting members, of a phase-splitting bridge connected in series with the said conducting members to the bridge that a symmetrical rotating electrostatic field is produced between the said conducting members.

2. In a single-phase electric circuit, the combination with a plurality of conducting members, of a phase-splitting bridge connected in series with the circuit, and means for connecting the said conducting members to the respective terminals of the bridge to produce a symmetrical rotating electrostatic field between the said conducting members.

3. A power-factor meter for a single-phase circuit comprising two movable conducting members connected to the respective conductors of the circuit, four stationary conducting members, and a phase-splitting bridge connected in series with the circuit and to the said stationary conducting member.

4. In a phase-indicating instrument for a single-phase circuit, the combination with two movable conducting members connected to the respective conductors of the circuit, and four stationary conducting members, of a bridge comprising equal-capacity reactance and resistance arms connected in series with the circuit and to the stationary conducting members.

5. In a phase-indicating instrument for a single-phase circuit, the combination with two movable conducting members connected to the respective conductors of the circuit, and four stationary conducting members, of a phase-splitting bridge connected to the circuit, and means for so connecting the stationary conducting members to the terminals of the bridge that a rotating symmetrical electrostatic field is produced between the stationary conducting members.

6. In a phase-indicating instrument for a single-phase circuit, the combination with coöperating relatively movable conducting members, of a phase-splitting bridge connected to the circuit, and means for so connecting the said conducting members to the terminals of the bridge and the circuit that they will assume definite positions with respect to each other in accordance with the phase-relation between the current and voltage of the circuit.

7. In a single-phase circuit, the combination with four stationary symmetrically-disposed conducting members, a movable conducting member, a phase-splitting bridge connected in series with the circuit, and means for connecting the stationary conducting members to the respective terminals of the bridge and the movable conducting member to the single-phase circuit.

In testimony whereof, I have hereunto subscribed my name this 24th day of Feb., 1917.

CHESTER T. ALLCUTT.